US010884253B2

(12) United States Patent
Singer et al.

(10) Patent No.: US 10,884,253 B2
(45) Date of Patent: Jan. 5, 2021

(54) APPARATUS AND METHOD FOR DEWETTING-BASED SPATIAL LIGHT MODULATION FOR HIGH-POWER LASERS

(71) Applicant: Rutgers, The State University of New Jersey, New Brunswick, NJ (US)

(72) Inventors: Jonathan Phillip Singer, Cranford, NJ (US); Tianxing Ma, Somerset, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 165 days.

(21) Appl. No.: 16/050,297

(22) Filed: Jul. 31, 2018

(65) Prior Publication Data

US 2019/0033606 A1 Jan. 31, 2019

Related U.S. Application Data

(60) Provisional application No. 62/539,158, filed on Jul. 31, 2017.

(51) Int. Cl.

*G02B 27/10* (2006.01)
*H01S 3/00* (2006.01)
*G02B 27/09* (2006.01)
*G02B 26/06* (2006.01)
*G02B 26/00* (2006.01)

(52) U.S. Cl.

CPC ....... *G02B 27/1026* (2013.01); *G02B 26/004* (2013.01); *G02B 26/06* (2013.01); *G02B 27/0977* (2013.01); *H01S 3/0085* (2013.01)

(58) Field of Classification Search

CPC .............. G02B 27/141; G02B 27/1006; G02B 27/145; G02B 27/142; G02B 19/0028
USPC .......................................................... 359/634
See application file for complete search history.

(56) References Cited

U.S. PATENT DOCUMENTS 5,540,966 A 7/1996 Hintz
5,604,829 A * 2/1997 Bruesselbach ..... G02B 6/02138 359/569
6,545,808 B1 * 4/2003 Ehbets ................ G02B 5/1857 359/15
2009/0303571 A1 12/2009 Sandstrom
2015/0014891 A1 1/2015 Amatucci et al.
(Continued)

OTHER PUBLICATIONS

Ferrer "Dewetting of Thin Films on Flexible Substrates via Direct-Write Laser Exposure" May 2015; Entire document; retrieved from https://rucore.libraries.rutgers.edu/rutgers-lib/47366/PDF/1/play/ on Sep. 25, 2018.
(Continued)

*Primary Examiner* — Mohammed A Hasan
(74) *Attorney, Agent, or Firm* — Greenberg Traurig, LLP

(57) ABSTRACT

An apparatus and method for dynamic and reversible patterning of mask layers and manipulation and redistribution of energy sources such as laser beams. An embodiment of the present invention provides an apparatus including a mirror-like thin film comprising a front surface and a back surface configured to reflect a laser beam; a layer of a mask material on top of the front surface of the mirror-like thin film, wherein the mask material is transparent to the laser beam and is dewetted by a heat source to create a height profile in the mask material.

20 Claims, 15 Drawing Sheets

10
16
16
28
24
20
12
26
18
30
22
14

(56) References Cited

U.S. PATENT DOCUMENTS

2015/0303064 A1 10/2015 Singer et al.

OTHER PUBLICATIONS

Singer et al. "Focused Laser-Induced Marangoni Dewetting for Patterning Polymer Thin Films" Journal of Polymer Science Part B: Polymer Physics, 2016, vol. 54(2), pp. 225-236 (entire document).

International Search Report and Written Opinion dated Oct. 30, 2018, issued by the U.S. Patent and Trademark Office in application No. PCT/US18/44437 filed Jul. 30, 2018.

* cited by examiner

APPARATUS AND METHOD FOR DEWETTING-BASED SPATIAL LIGHT MODULATION FOR HIGH-POWER LASERS

CROSS-REFERENCE TO RELATED APPLICATION

The present application claims priority from U.S. Provisional Patent Application Ser. No. 62/539,158 filed Jul. 31, 2017, and entitled "DEWETTING-BASED SPATIAL LIGHT MODULATION FOR HIGH-POWER LASERS," which is incorporated herein by reference in its entirety for all purposes.

FIELD OF THE INVENTION

The present invention relates to dynamic and reversible patterning of mask layers and manipulation and redistribution of energy sources such as laser beams.

BACKGROUND OF THE INVENTION

A spatial light modulator ("SLM") is an active optical component that allows for the localized, dynamic manipulation of the phase of light either by transmission or reflection off of active phase-shifting pixels. The net result is that focal-plane intensity maps can be programmed into the beam, with a sparse spacing of sources that result in multi-spot patterns, and a dense spacing of sources resulting in "single point" sources of non-Gaussian shape, or point spread function. Combinations of intensity maps can be used to make multi-spot, non-Gaussian patterns/

Dynamic SLMs ("DSLMs") are exceptionally useful devices for the manipulation of optical wave fronts. The current technology relies on advanced liquid crystal optical technology to produce the phase shifts. Liquid crystal optical technology is highly controllable, but liquid crystals are relatively fragile organic systems. As a result, DSLMs that use liquid crystal technology are only viable across a specific range of wavelengths (about 400 nm to about 1700 nm) and powers (less than 10 $W/cm^2$). Further, a given DSLM is generally optimized for a narrow wavelength band of ~100 nm.

SUMMARY OF THE INVENTION

The present invention provides an apparatus and method for dynamic and reversible patterning of mask layers and manipulation and redistribution of energy sources such as laser beams. An embodiment of the present invention provides the DSLM for manipulating a laser beam that operates at wavelengths or powers that are not readily handled by conventional liquid crystal SLMs. In some embodiments, an exemplary DSLM is based on focused optical spike dewetting ("FOSk" dewetting). FOSk creates large thermal gradients ($10^4$~$10^9$ K/m) by absorption of a focused optical heat source, which may be a laser, to create enhanced Marangoni force or thermocapillary force that drives fluid and molten materials down the thermal gradient. Use of thermocapillary dewetting to implement the apparatus and the method provided by the present invention enables operation on all laser wavelengths (e.g., wavelengths in the range of 10 nm to 10.6 μm) used in the majority of lasers at similar pixel resolutions as those liquid crystal SLMs.

In some embodiment, the present invention enables operation on laser wavelengths in the range of 12 nm to 10.6 μm. In some embodiment, the present invention enables operation on laser wavelengths in the range of 10 nm to 8 μm. In some embodiment, the present invention enables operation on laser wavelengths in the range of 12 nm to 8 μm. In some embodiment, the present invention enables operation on laser wavelengths in the range of 14 nm to 10.6 μm. In some embodiment, the present invention enables operation on laser wavelengths in the range of 10 nm to 6 μm. In some embodiment, the present invention enables operation on laser wavelengths in the range of 14 nm to 6 μm.

In an embodiment of an apparatus of the present invention, the apparatus includes a mirror-like thin film comprising a front surface and a back surface configured to reflect a laser beam; and a layer of a mask material on top of the front surface of the mirror-like thin film, wherein the mask material is transparent to the laser beam and is dewetted by a heat source to create a height profile in the mask material.

In some embodiments, the heat source is a focused optical spike ("FOSk") source and a supporting element supporting the mirror-like thin film through contact with the back surface of the mirror-like thin film, wherein the supporting element is transparent to the optical source.

In some embodiments, the optical source is a laser.

In some embodiments, the heat source is provided by electronic heaters.

In some embodiments, the mask material is a molten-phase mask material selected from a group consisting of silicon oils, paraffin oils, and thermoplastic polymers.

In some embodiments, the mirror-like thin film is a thin film of a material selected from a group of materials consisting of gold, tungsten, aluminum, and silver.

In some embodiments, the mask material is not heated directly by the laser beam.

In some embodiments, the mirror-like thin film is composed of one or more materials.

In some embodiments, the mirror-like thin film is composed of one or more layers.

In some embodiments, the optical source has a spatially-varying energy profile.

In some embodiments, the spatially-varying energy profile of the optical source is varied dynamically so that a spatial distribution of energy spikes changes over time, causing the height profile of the mask material to also change over time.

In some embodiments, the spatially-varying energy profile is imposed on the optical source by a separate spatial light modulator ("SLM").

In some embodiments, the apparatus further comprises a guiding means for guiding the optical source to the back surface of the mirror-like thin film.

In some embodiments, the laser beam passes through the height profile of the mask material before and after it is reflected by the mirror-like thin film, resulting in changes in a wave front of the laser beam.

In some embodiments, the wave front of the laser beam varies over time while it passes through a time-varying height profile of the mask material.

In some embodiments, the optical source produces a local heated area in the mirror-like thin film.

In some embodiments, the local heated area comprises a spatial distribution of temperature spikes that correspond to a spatial distribution of energy spikes impinging on the back surface of the mirror-like thin film and induce the FOSk dewetting of the mask material on top of the mirror-like thin film.

In an embodiment of a method of the present invention, the method includes guiding a heat source having a spatially-varying energy field having energy spikes to a back surface of a mirror-like thin film, wherein a layer of a mask material is on top of a front surface of the mirror-like thin film; inducing dewetting at the front surface of the mirror-like thin film by heating the mirror-like film via the heat source; and creating, via the dewetting, a height profile in the mask material by causing the mask material to accumulate adjacent to dewetted areas of the mirror-like thin film, wherein the height profile represents a distribution of the dewetted areas of the mirror-like thin film.

In an embodiment of the method of the present invention, the spatially-varying energy field having energy spikes is imposed on a laser beam or other heat source which is directed to the back side of the mirror-like thin film. The heat source heats the mirror-like film, inducing FOSk dewetting at the front surface of the mirror-like thin film. The dewetting phenomenon creates the height profile in the mask material that represents the distribution of the dewetted thin film and accumulated mask material adjacent to the dewetted thin film. The distribution of the dewetted thin film corresponds to the distribution of the energy spikes impinging on the back side of the thin film. A laser beam is reflected by the front side of the thin film, and is phase shifted according to the height profile of the mask material. The height profile of the mask material can be dynamically varied by dynamically varying the spatial distribution of the energy field o the heat source.

In some embodiments, the optical source is a laser beam impinges on the back surface of the mirror-like thin film producing a local heated area in the mirror-like thin film.

In some embodiments, the local heated area comprises a spatial distribution of temperature spikes that correspond to the spatial distribution of the energy spikes of the heat source impinging on the back side of the mirror-like thin film.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF THE DRAWINGS

Figure 1:
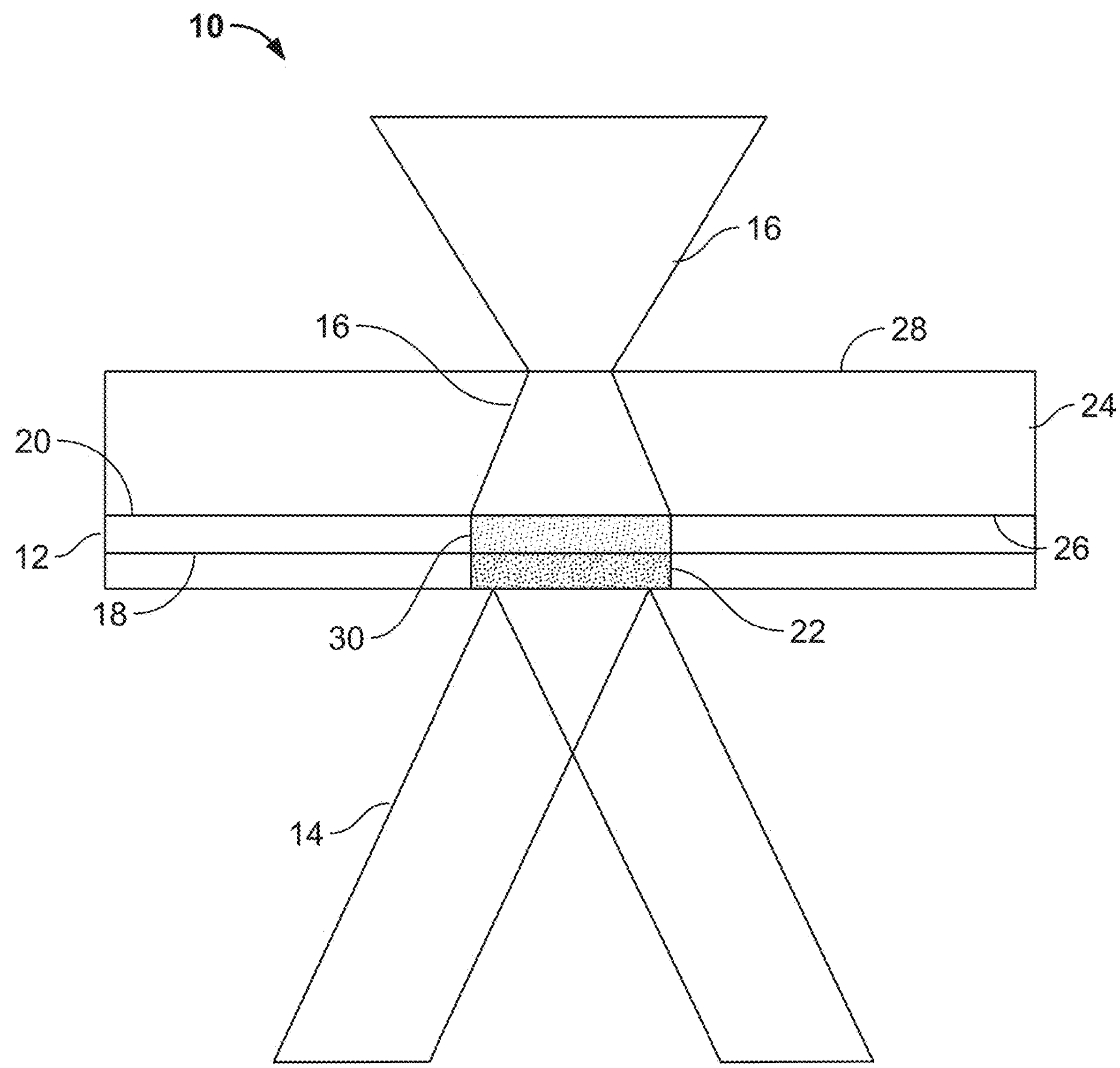
FIG. 1 is a schematic illustration of a DSLM according to an embodiment of the present invention.

Reference will now be made to several embodiments of the present invention(s), examples of which are illustrated in the accompanying figures. Wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

All terms defined herein should be afforded their broadest possible interpretation, including any implied meanings as dictated by a reading of the specification as well as any words that a person having skill in the art and/or a dictionary, treatise, or similar authority would assign thereto.

The terms, "for example", "e.g.", "optionally", as used herein, are intended to be used to introduce non-limiting examples. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." In addition, the terms "comprises" and "comprising" when used herein specify that certain features are present in that embodiment, however, this phrase should not be interpreted to preclude the presence or additional of additional steps, operations, features, components, and/or groups thereof.

Embodiments of the invention disclosed herein use FOSk dewetting of thin films for the guidance of laser beams across a broader range of laser wavelengths and powers than has been achieved by liquid crystal technology. Any thin film, due to its index of refraction, causes a phase shift in light. Changes in the height profile of a film, such as the curvature of a thin lens, will lead to spatially-dependent phase shifts. Changes in the height profile of a thin film lens results in changes of the focus of a laser beam. More complex manipulations of a laser beam can be realized by controlled dewetting of thin films at the pixel-level of control of an SLM.

FOSk dewetting uses a thermal energy field to induce the locally controlled flow of liquids. In exemplary embodiments of the present invention, the thermal energy field may be created by, for example, a focused laser beam or a focused lamp source. Other non-optical sources may also be employed, such as an electron beam, an electrical resistance heat source, or another static or dynamic heat source. An exemplary FOSk dewetting for thermal direct write using a laser, referred to as focused laser spike ("FLaSk"), in order to create patterning on thin films is illustrated in US20150303064, the disclosure of which is incorporated by reference herein in its entirety.

FOSk dewetting has the potential to create large height profile changes in a thin film. Aspect ratios of about 1:10 have been demonstrated. At such aspect ratios, the pixel sizes of current SLM technology (e.g., a pixel size of about 10 μm), could allow for height profile variations at the micron scale, if the profiles are created by FOSk dewetting. Therefore, an SLM based on FOSk dewetting could provide no or complete half-phase shifting of relevant laser wavelengths (e.g., between 10 nm to 10.6 μm). In some applications, the temporal response of an SLM that employs FOSk dewetting could be slow compared to liquid crystal technology, but the usable materials library would be much larger. Further refinements of the FOSk dewetting SLM, such as selection of thin film materials, or improved design of the elements of FOSk dewetting devices, may allow response times comparable to liquid crystal technologies.

FIG. 1 is a schematic diagram of an embodiment of a dynamic SLM ("DSLM") 10 according to an exemplary embodiment of the present invention. The DSLM 10 comprises a mirror-like thin film 12 for reflecting a laser beam 14 and absorbing energy from an optical source 16. The mirror-like thin film 12, which could be composed of one or multiple materials and/or layers, has a front surface 18, and a back surface 20, with a layer of a molten-phase mask material 22 residing on and wetting the front surface 18 of the mirror-like thin film 12. The DSLM 10 further includes a second DSLM (not shown) for imposing spatially-varying energy profiles on the optical source 16. The DSLM 10 yet further includes a guiding means (not shown) for guiding the optical source 16 to the back surface 20 of the mirror-like thin film 12. In an embodiment, the DSLM 10 yet further includes a supporting member 24 that supports the mirror-like thin film 12 through contact of a front surface 26 of the supporting member with the back surface 20 of the mirror-like thin film 12, the supporting member 24 being sufficiently transparent to the wavelength of the optical source 16.

In the afore-described exemplary embodiment, the mirror-like thin film 12 is a thin film of gold. Such a film absorbs green and UV light, which are compatible with a liquid crystal SLM, such as might be used with the optical source 16, and can reflect a laser beam (e.g., the laser beam 14) having a wavelength of 10.6 μm at a power of about 200 $W/cm^2$, which are typical of a commercial laser cutter. Other absorbing materials, such as tungsten, are known to form thin films, and are suitable for absorbing the aforementioned exemplary optical source 16 at other wavelengths than green or UV. Similarly, other reflective materials, such as silver, are known that form thin films, and are suitable for reflecting the aforementioned exemplary laser beam 14 or other laser beams having wavelengths other than 10.6 μm and/or powers other than 200 $W/cm^2$, when made part of a DSLM such as DSLM 10. Further, layered mirrors of one or more metals could allow for optimized heating by optical source 16 of the lower layer and optimized reflection of laser beam 14 by the top.

The molten-phase mask material 22 is sufficiently transparent to the laser beam 14 that the mask material is not heated directly by the laser beam 14. The molten-phase mask material 22 also wets the front surface 18 of the mirror-like thin film 12 well. In the afore-described exemplary embodiment, a suitable molten-phase mask material 22 is a paraffin wax. Other molten linear or cyclical oligomers, such as silanes or cycloalkanes, are other exemplary liquid mask materials that are suitable for use in the present invention. Polyvinyl acetate and other thermoplastic polymers are other exemplary molten-phase mask materials that are suitable for use in the present invention.

In embodiments of the present invention, the laser beam 14 is not itself part of the device 10, but is included in FIG. 1 to illustrate the function of the DSLM 10. The optical source 16, however, provides the energy field that induces FOSk dewetting of the molten-phase mask material 22 in the exemplary embodiment discussed above. As has been mentioned elsewhere herein, other exemplary embodiments of the DSLM may include other sources of energy fields in place of the optical source 16. In such other exemplary embodiments, the energy field may be provided by, for example, an electron beam, an electrical resistance heat source, or another static or dynamic heat source. It will be obvious to one having ordinary skill in the art that one or both of the second DSLM and the guiding means may be omitted from the DSLM 10, depending on the structure and operation of the source of the energy field. For example, an electrical resistance heat source may be placed near or in contact with the back surface 20 of the mirror-like thin film 12 or a back surface 28 of the substrate 24.

Another embodiment of the present invention comprises a method of using FOSk dewetting to dynamically manipulate the wave front of a laser beam, so as to produce, for example, multi-spot patterns or non-Gaussian shapes or point spread functions. An exemplary embodiment of the method of the present invention may be implemented using the DSLM 10 described above with respect to FIG. 1. Such an exemplary embodiment of the method is described herein, wherein the parts of the DLSM 10 referenced in the description of the embodiment of the method are the same as those referenced in the discussion of the DSLM 10 illustrated in FIG. 1.

In the exemplary embodiment of the method, an SLM (not shown) imposes a spatially-varying energy profile on the optical source 16, which includes energy spikes spatially-distributed in the energy profile. The optical source 16 is guided to the back surface 20 of the mirror-like film 12, where it impinges on the mirror-like film 12, thereby producing a local heated area 30 in the mirror-like thin film 12. The local heated area 30 includes a spatial distribution of temperature spikes (i.e., small areas of higher temperature within the heating profile) that correspond to the spatial distribution of the energy spikes impinging on the back surface of the mirror-like thin film 12 and are hot enough to induce dewetting of the mask material 22 from the front surface 18 of the mirror-like thin film 12. The dewetting phenomenon occurs over the temperature spikes, exposing the front-surface 18 of the mirror-like film 12 in areas that correspond to the spatial distribution of the temperature spikes, and causes the molten-phase mask material 22 to accumulate adjacent to the dewetted areas. As a result, the molten-phase mask material 22 becomes distributed in a pattern of trenches where the front surface 18 of the mirror-like thin film 12 is exposed by dewetting and peaks of accumulated mask material 22 adjacent to the trenches. In other words, the dewetting phenomenon forms a height profile of peaks and trenches having a spatial distribution where the low points of the profile (i.e., the trenches) correspond to the spatial distribution of the energy spikes of the optical source 16.

Figure 2:
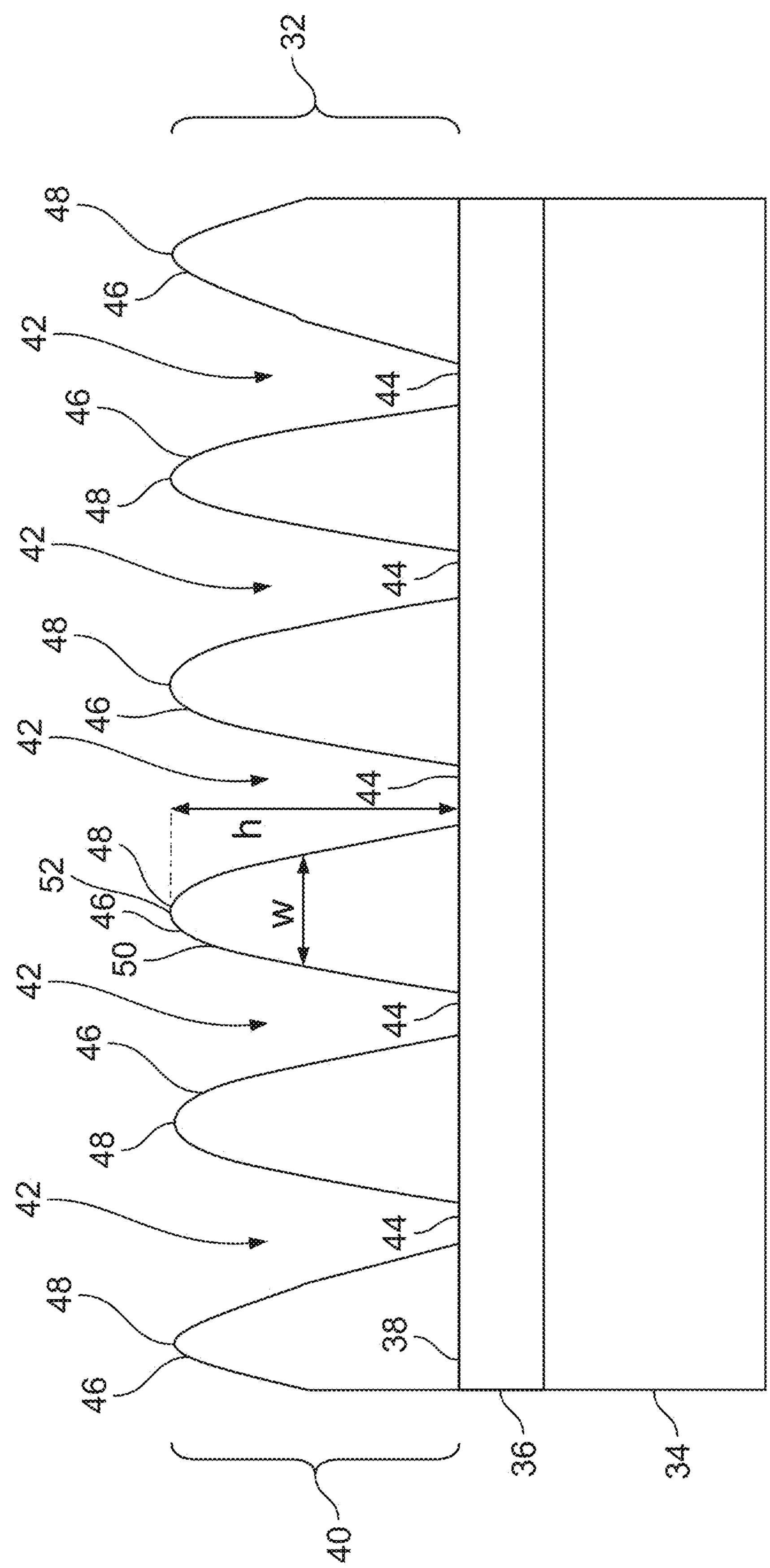
FIG. 2 is a schematic representation of an exemplary height profile of a patterned mask material according to an embodiment of the present invention.

An exemplary height profile 32 is shown in FIG. 2, showing a substrate 34 supporting a mirror-like thin film 36 having a front surface 38, the substrate 34 and mirror-like thin film 36 being similar in structure and arrangement to the substrate 24 and mirror-like thin film 12 of FIG. 1. The height profile 32 is a vertical cross-section of a mask material 40 that is similar to the mask material 22 of FIG. 1 and is not drawn to scale. The height profile 32 includes trenches 42, each trench 42 having a bottom 44 where the front surface 38 of the mirror-like thin film 36 has been exposed by dewetting, and peaks 46 where the mask material 38 has accumulated adjacent to the trenches 42, each peak having a top end 48. Each peak 46, of which peak 50 is an example, has a width (w), measured across the peak 50, and a height (h), measured from the front surface 38 of the mirror-like thin film 36 to the top 52 of the peak 50. In an embodiment of the method of the present invention, the height profile 32 has an aspect ratio w:h of about 1:10.

In an embodiment of the method of the present invention, the imposing of the spatially-varying energy field in the optical source 16, the guiding of the optical source 16 to the back surface 20 of the mirror-like thin film 12, the production of the heating profile at the local heated area 30, the induction of dewetting at the front surface 18 of the mirror-like thin film 12, and the formation of the height profile are concurrent steps of the exemplary method.

In an embodiment of the present invention, the laser beam 14, which is the laser beam that is to be diffracted by the DSLM 10, is directed or guided to the front surface 18 of the mirror-like thin film 12 such that it is reflected by the mirror-like thin film 12. In an embodiment, the mirror-like thin film 12 reflects the laser beam 14 at a shallow angle. In an embodiment, the laser beam 14 passes through the height profile of the molten-phase mask material 22 before and after it is reflected by the mirror-like thin film 22, resulting in changes in the wave front of the laser beam 14.

In an embodiment of the method of the present invention, the spatially-varying energy profile in the optical source 16 is varied dynamically so that the spatial distribution of energy spikes changes over time, causing the height profile of the molten-phase mask material 22 to also change over time. As a result, the wave front of the laser beam 14 also varies over time while it passes through the time-varying height profile of the molten-phase mask material. In an embodiment of the method of the present invention, the operation of the SLM that operates on the optical source 16 is controlled by a computer model. In an embodiment of the method of the present invention, the computer model controls the imposition of a spatially-varying energy field on the optical source 16, such that the laser beam 14 is multiplexed into a plurality of spots. In an embodiment of the method of the present invention, the laser beam 14 is of a type used in commercial laser cutters. In an embodiment of the method of the present invention, the laser beam 14 has a wavelength in the range of 10 nm to 10.6 μm. In an embodiment of the method of the present invention, the laser beam 14 has a source power of greater than 200 W/cm$^2$.

Experimental Examples

Figure 3:
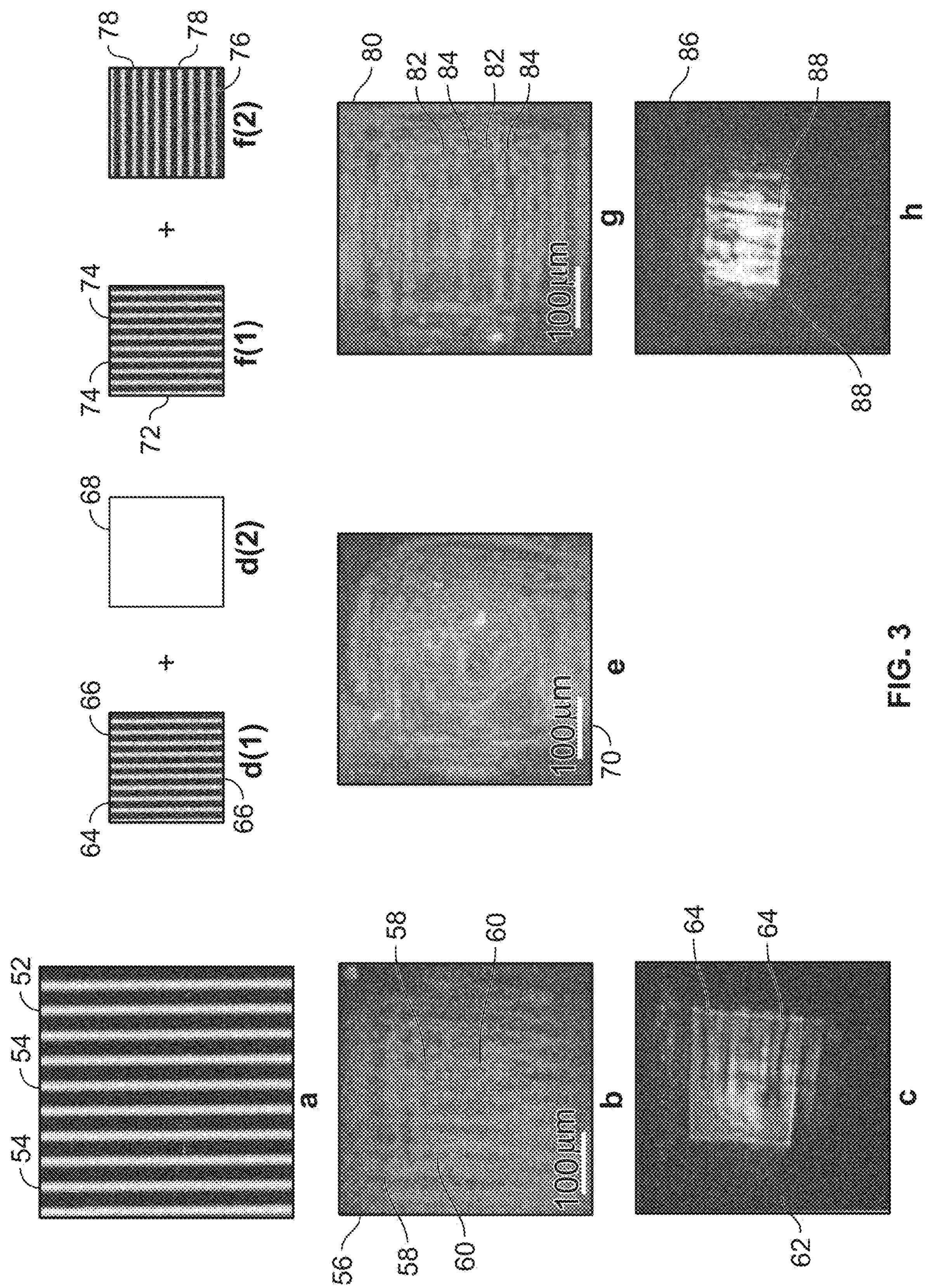
FIG. 3 is a composite of photographic images and schematic illustrations demonstrating the performance of a DSLM made and operated according to embodiments of the present invention.

The following examples illustrate the operation of a proof-of-concept DSLM constructed according to the embodiments of FIG. 1 and operated according to the exemplary method thereof. FIG. 3 is a composite of images representing three experiments that demonstrate, respectively, the operation of a DSLM according to an embodiment of the present invention to write a pattern in a mask material (images a, b, c); the operation of a DSLM according to an embodiment of the present invention to clear a written pattern (images d(1), d(2), e); and the operation of a DSLM according to an embodiment of the present invention to rewrite the pattern in a mask material (images f(1), f(2), g, h).

FIG. 3 images a, d(1), d(2), f(1), and f(2) illustrate the light patterns of spatially-varied energy distributions formed by an SLM operating on a laser beam. FIG. 3 image d(2) represents a uniform energy distribution. FIG. 3 images b, e, and g are transmission optical microscope images of the dewetted mask material after exposure of the mirror-like thin film to the energy distributions shown in FIG. 3 images a, d(1), d(2), f(1), and f(2). FIG. 3 images c and h are reproductions of the diffraction patterns in the reflected laser beam after it passed through the mask material.

In the DSLM, the substrate for the mirror-like thin film is a No. 1.5 glass coverslip, which has a standard thickness of 0.16 to 0.19 mm. The mirror-like thin film is formed by sputter-coating one surface of the coverslip with gold to a thickness of 170 nm±10 nm. Polyvinyl acetate ("PVAc") with molecular weight of 100,000 Da and glass transition temperature of around 34° C. in propylene glycol monomethyl ether acetate ("PGMEA") is drop-cast on the gold thin film.

The light patterns illustrated in FIG. 3 images a, d(1), d(2), f(1), and f(2) are formed by reflecting a laser beam off of an SLM (Meadowlark PDM512-0532 spatial light modulator). The laser is a 532 nm continuous wave laser with a power of 600 mW±50 mW. After reflection from the SLM, the laser beam is then focused by a telescope to a spot of about 1 mm in size on the back side of the gold thin film through the glass coverslip. The gold thin film is exposed to the laser beam for about 5 seconds to create the dewetting patterns shown in images b, e, and g. To image the diffraction pattern of the phase mask, the same 532 nm laser is used at a low power of less than 2 mW, and reflected by the gold thin film through the PVAc mask material.

In the first experiment, the gold thin film is exposed to a light pattern 52 of parallel lines 54 of energy spikes (FIG. 3 image a). The PVAc mask material 56 shows parallel peaks 58 and trenches 60 (FIG. 3 image b) in the same orientation as parallel lines 34, demonstrating that the light pattern 52 can be used to form an organized height profile in a mask material. A diffraction pattern 62 of the reflected laser beam has parallel lines 64, demonstrating that a mask material with an organized height profile can impose a spatially-distributed wave front (i.e., the diffraction pattern) on a laser beam passed through the height profile of mask material.

In the second experiment, the gold thin film is exposed to a light pattern 64 of parallel lines 66 of energy spikes (FIG. 3 image d(1)), then exposed to a uniform energy field 68 (FIG. 3 image d(2)). The PVAc mask material 70 has a disorganized distribution (FIG. 3 image e), showing that a uniform energy field can be used to clear an organized height profile from the mask material.

In the third experiment, the gold thin film is exposed to a light pattern 72 of parallel lines 74 of energy spikes (FIG. 3 image f(1)), then exposed to a light pattern 76 having parallel lines 78 of energy spikes oriented in a direction that is perpendicular to the orientation of the parallel lines 74 (FIG. 3 image f(2)). The PVAc mask material 80 shows parallel peaks 82 and trenches 84 (image g) in the same orientation as the parallel lines 74, demonstrating that the light pattern 72 can be used to rewrite a pattern previously imposed on a mask material. A diffraction pattern 86 of the reflected laser beam parallel lines 88, again demonstrating that a mask material with an organized height profile can impose a spatially-distributed wave front (i.e., the diffraction pattern) on a laser beam passed through the height profile of the mask material.

Simulation Examples

The following examples illustrate exemplary simulations of a proof-of-concept DSLM constructed according to the embodiment of FIG. 1, and operated according to the exemplary method thereof. In one embodiment, the proof-of-concept DSLM for a variable lens via selective polymer dewetting is illustrated herein.

In some embodiments, in the context of laser-based 3D printing, effective mechanisms for spatial light modulation could drastically increase the throughput of traditional laser-based 3D printing of metal structures by making laser patterning parallelizable. Thermal, flow, and photonics simulations may be conducted to evaluate the feasibility and physical limitations of a spatial light modulator implemented via a selectively dewetted polymer in this context. In certain embodiment, thermal simulations are carried out on a polymer-metal multilayer to study the resultant three-dimensional thermal profile. This ultimately led to the following conclusions: 1) reflow through uniform surface tension is not an effective way to return to ground state between prints and 2) there is a significant phase shift incurred by the polymer during photonic patterning.

Thermal Simulation

In some embodiment, the system is modeled as a 2D-axisymmetric multilayer consisting of simulated materials with the properties of polydimethylsiloxane, an absorbent porous carbon layer, and copper. The copper block acts as both a physical support and sink through which the laser-heated system can dissipate heat. This component of the overall simulation studies 2-μm thick PDMS on a 10-μm carbon layer.

In some embodiment, target film thickness is the governing quantity and determined mesh size and other materials' dimensions. A 2-μm film is thermally simulated to produce a thermal gradient over the large area for use in the fluid simulation. Laser heating is modeled through two adjacent sources using the commercial software COMSOL Multiphysics. The two sources are an axial point source and line heat source 1 μm apart. Open boundaries are applied to the copper block to allow free heat flow while all other outer boundaries are maintained thermally insulated. In the physical system, no such insulation exists; however, given the duration of these experiments and the operational length scales, heat loss through these low-conductivity surfaces are negligible. This length scale also permits neglecting the effects of gravity. As a preliminary study, a single axial point source, referred to as a "qpoint", is applied independent of the secondary line heat source. The study is then repeated with both sources activated. Each qpoint is set to equal heat rates such that the total heat applied to the system is doubled. This configuration is an exemplary simplification of the physical system according to the above embodiment. A time dependent study is run for 0.25 s at a 0.01 s time step.

Figure 4A:
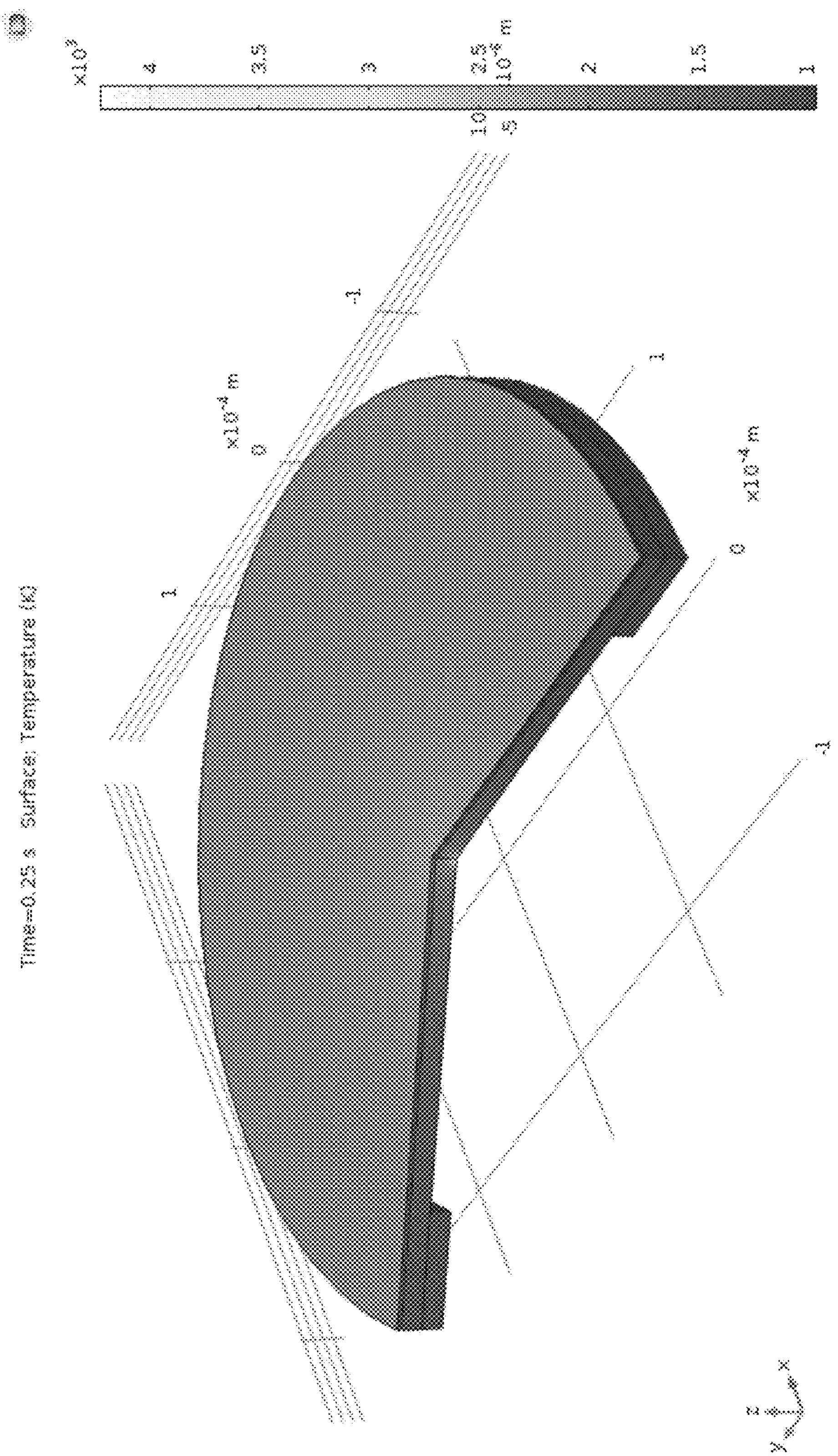
FIGS. 4(*a*) and 4(*b*) are schematic representations of exemplary simulated thermal profiles according to an embodiment of the present invention.
Figure 4B:
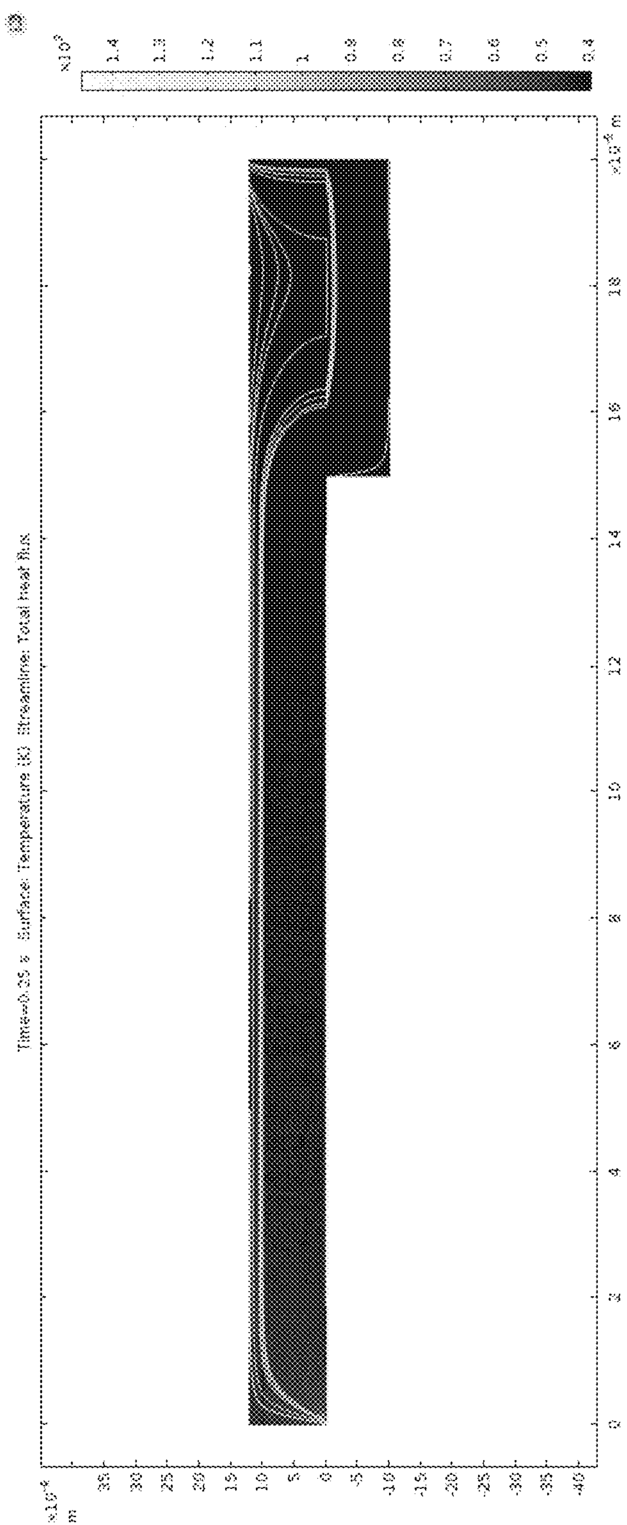

FIG. 4 illustrates simulated thermal profiles according to an embodiment of the present invention. Upon applying a heat source at two points, the simulated result of a thermal profile is shown in FIG. 4(*a*). Heat concentrates on the central axis due to the low conductivity of carbon and PDMS, and the streamlines along which heat flows radially are shown in FIG. 4(*b*). Peak temperatures in the various domains can also be observed through the color maps, showing as high as around 490 K in PDMS and up to ~1400 K in carbon.

Figure 5A:
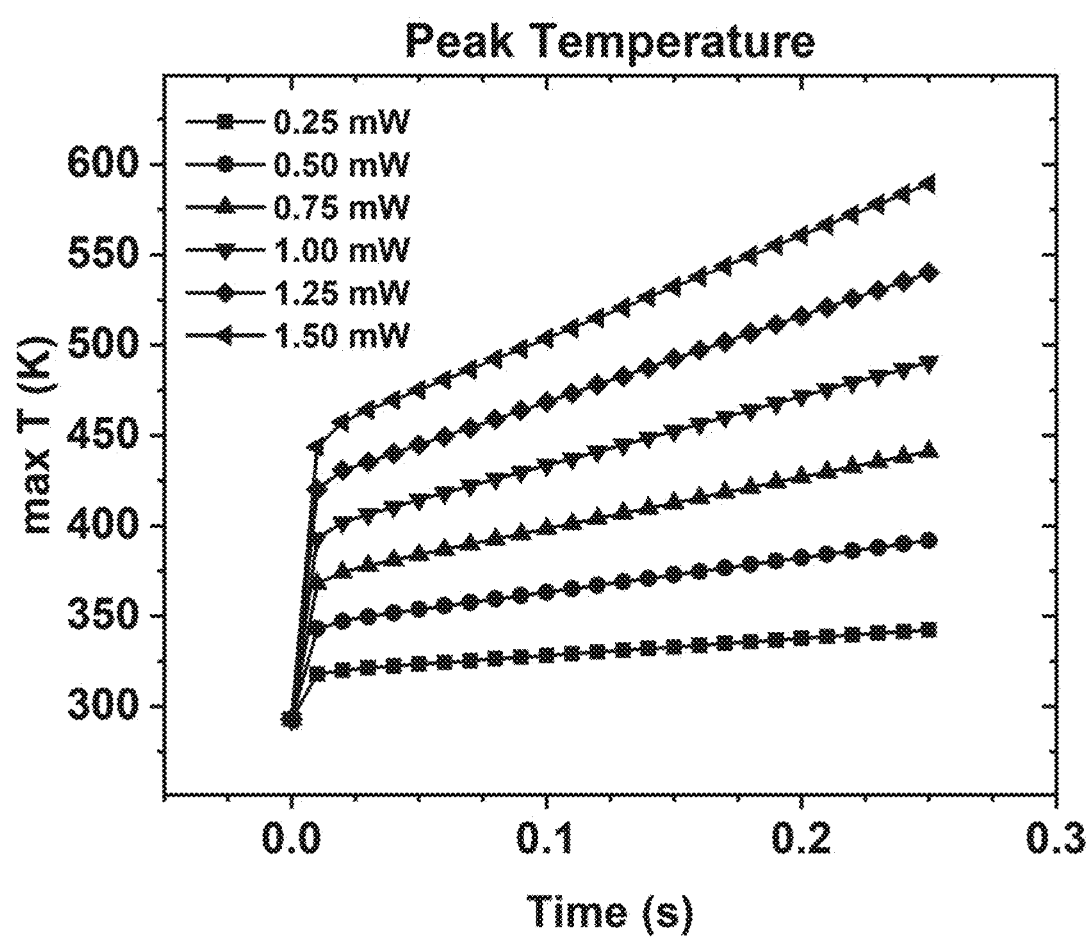
FIGS. 5(*a*) and 5(*b*) are schematic representations of exemplary plotted data of approximated heat source's rise time during FOSk dewetting according to an embodiment of the present invention.
Figure 5B:
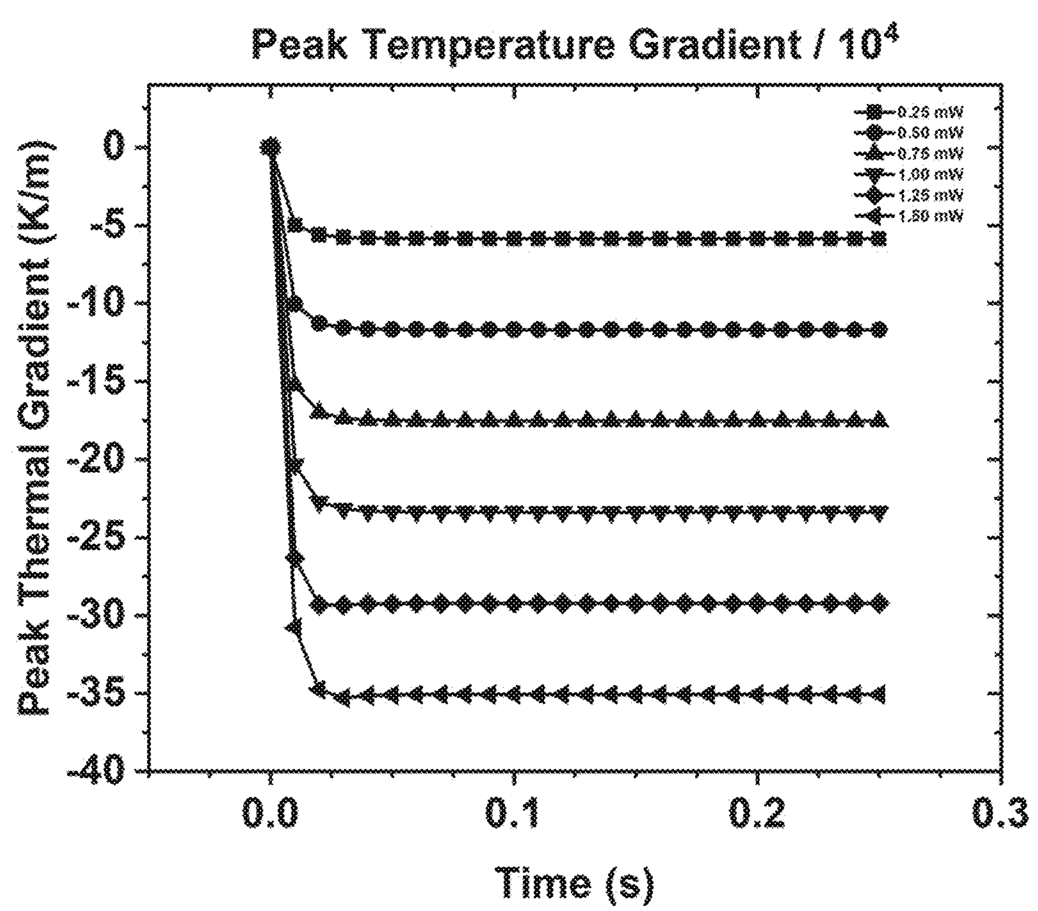

FOSk dewetting is a time dependent process because of the films' response times to heating. FIG. 5 illustrates plotted data of approximated heat source's rise time during FOSk dewetting according to an embodiment of the present invention. Particularly, FIG. 5(*a*) illustrates peak temperatures of the heat source as a function of time and FIG. 5(*b*) illustrates peak temperatures gradient as a function of time. If heat is constantly applied, maximum temperature will continue to rise. However, the radial thermal gradient quickly attains a steady state at ~0.03 s as observed in FIG. 5(*b*). This corresponds with the flattening of peak temperatures and the evolution of a linear rise in temperature.

Flow Simulation

To minimize complexity, the scenario depicted in relation with FIG. 5 is modelled as a 2D axisymmetric region of PDMS, 1 μm thick according to some embodiment. Modelling the dewetting behavior of the polymer would typically entail coupling nonisothermal flow with a two-phase deformable mesh and solid heat conduction through multiple regimes, which would be computationally expensive. To reduce computational costs, thermal simulations may be performed separately assuming a film twice as thick, and the resulting temperature field is exported to the liquid flow model using the general extrusion feature to calculate the surface tension according to some embodiment. Differences due to variations in transient behavior are mitigated by applying various rise mechanisms in the temperature profile. The resulting model consisted of a single 2D axisymmetric film with a deformable, variably stressed top mesh.

It is assumed that at the operating temperatures, the entire polymer would be in a melt state according to the above embodiment. Therefore, the polymer may be modelled as an incompressible fluid with the default properties of liquid PDMS, the dynamic viscosity of Sylgard PDMS (5500 mPa*s) and the surface tension and Marangoni coefficients of silicone oil (0.021 N/m and $-9.99*10^{-5}$ N/(m*K) respectively [3]). A further exemplary of the above modelling is illustrated in A. Murata and S. Mochizuki, "Motion of droplets induced by the Marangoni force on a wall with a temperature gradient," *Heat Transfer: Asian Research*, vol. 33, no. 2, pp. 81-93, 2004, which is incorporated herein by reference.

Transient Application of Surface Tension: to explore transient behavior, the thermal profile obtained with a 1 mW point source representation of an incident laser on the carbon substrate. This is then applied to the flow model with several different temporal variations. Temperature 90% rise time is 0.15 s in the thermal simulation, so most flow simulations lasted 0.3 s.

A control study is conducted with only the constant ambient temperature influencing surface tension. Results are unremarkable; without a gradient, no variables deviated from their initial values.

Figure 6:
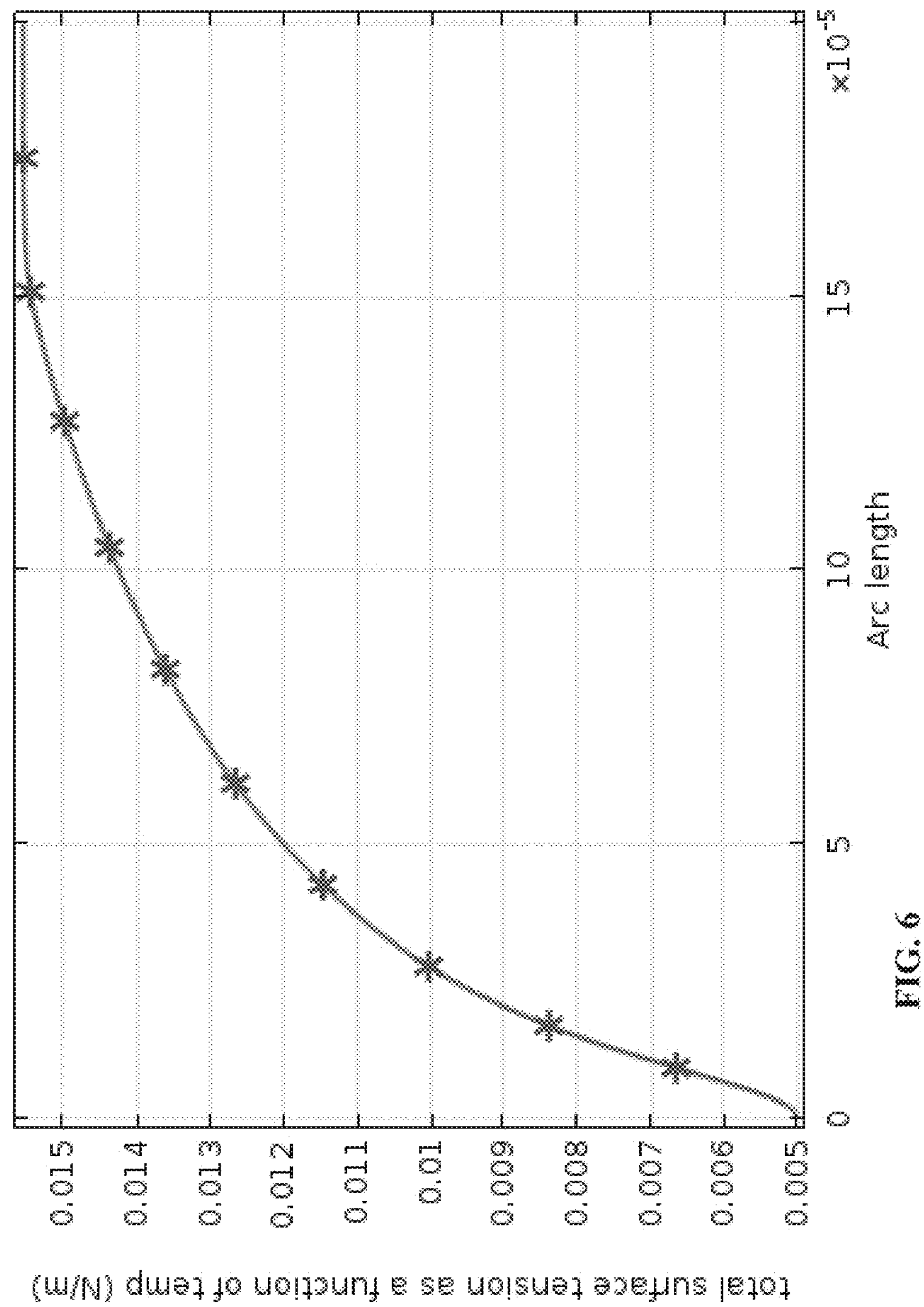
FIG. 6 is a schematic representation of an exemplary surface tension for a constant imported temperature profile according to an embodiment of the present invention.
Figure 7:
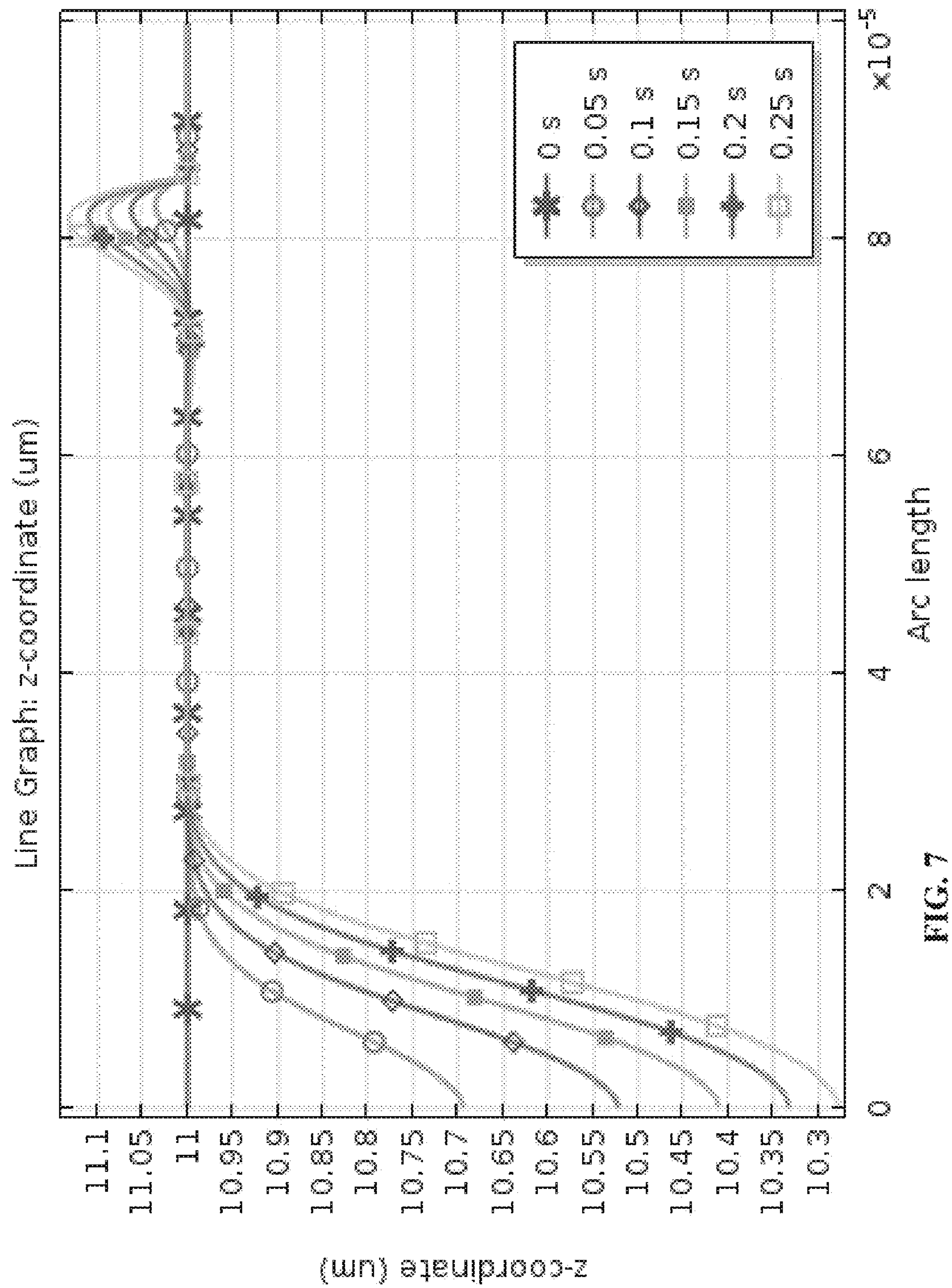
FIG. 7 is a schematic representation of an exemplary constant film height variation according to an embodiment of the present invention.

Next, the final raised temperature profile is applied constantly throughout the 0.3 s simulation, producing the results in FIGS. 6 and 7. FIG. 6 illustrates a surface tension for a constant imported temperature profile according to an embodiment of the present invention. FIG. 7 illustrates a constant film height variation. Curves diverge from the horizontal with time according to an exemplary embodiment of the present invention.

In some embodiment, the base of the polymer film resides at 10 μm to enable general extrusion from the thermal model, so 11 μm represents the equilibrium interface height. Material may be moved away from the center point source increasingly with time as anticipated, reaching a minimum height of 0.25 μm after 0.3 s. Because the outer edge is a closed boundary, this simulation exhibits aphysical conditions as material moves along the surface tension gradient and builds up at the outer edge. These conditions cannot be reconciled in an axisymmetric simulation because there is no periodic or symmetric boundary condition: it would have to be part of a full 3D study.

To observe a more accurate representation of temperature rise and fall, the imported temperature profile is applied to the flow model with the relation $T_f=T_{amb}+(T_h-T_{amb})*\sin(pi*t/t_{total})$, where $T_{amb}$ is the ambient temperature, $T_h$ is the peak temperature generated by the optical source, and $t_{total}$ is the total simulation time of 0.3 s. Using this approximation, the results in the proceeding figures are obtained.

Figure 8:
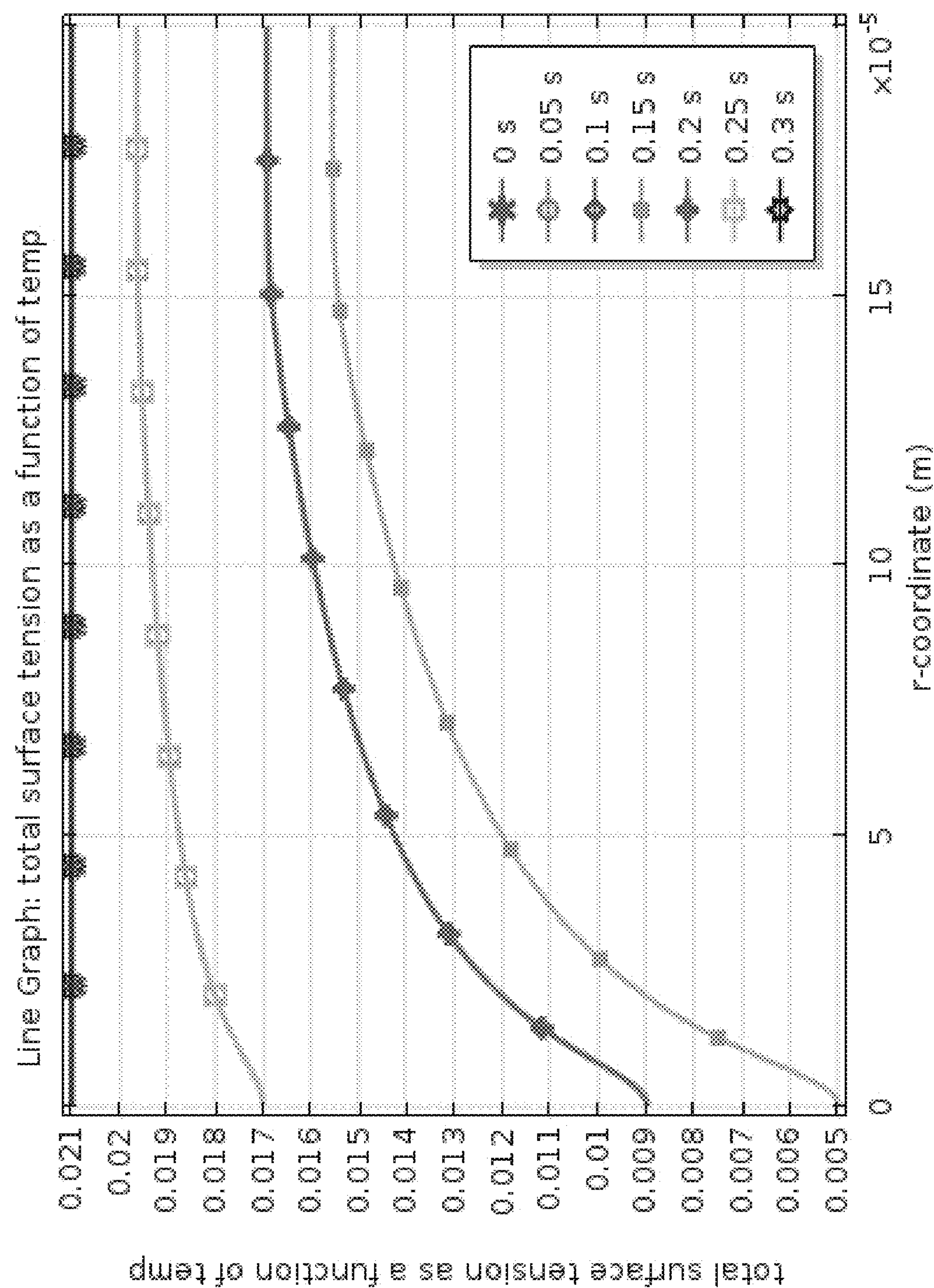
FIG. 8 is a schematic representation of an exemplary surface tension under a $\sin^2$ temperature variation in time according to an embodiment of the present invention.

FIG. 8 illustrates surface tension under a $\sin^2$ temperature variation in time according to an embodiment of the present invention. The top line represents initial and final conditions, and teal is the peak loading.

Figure 9:
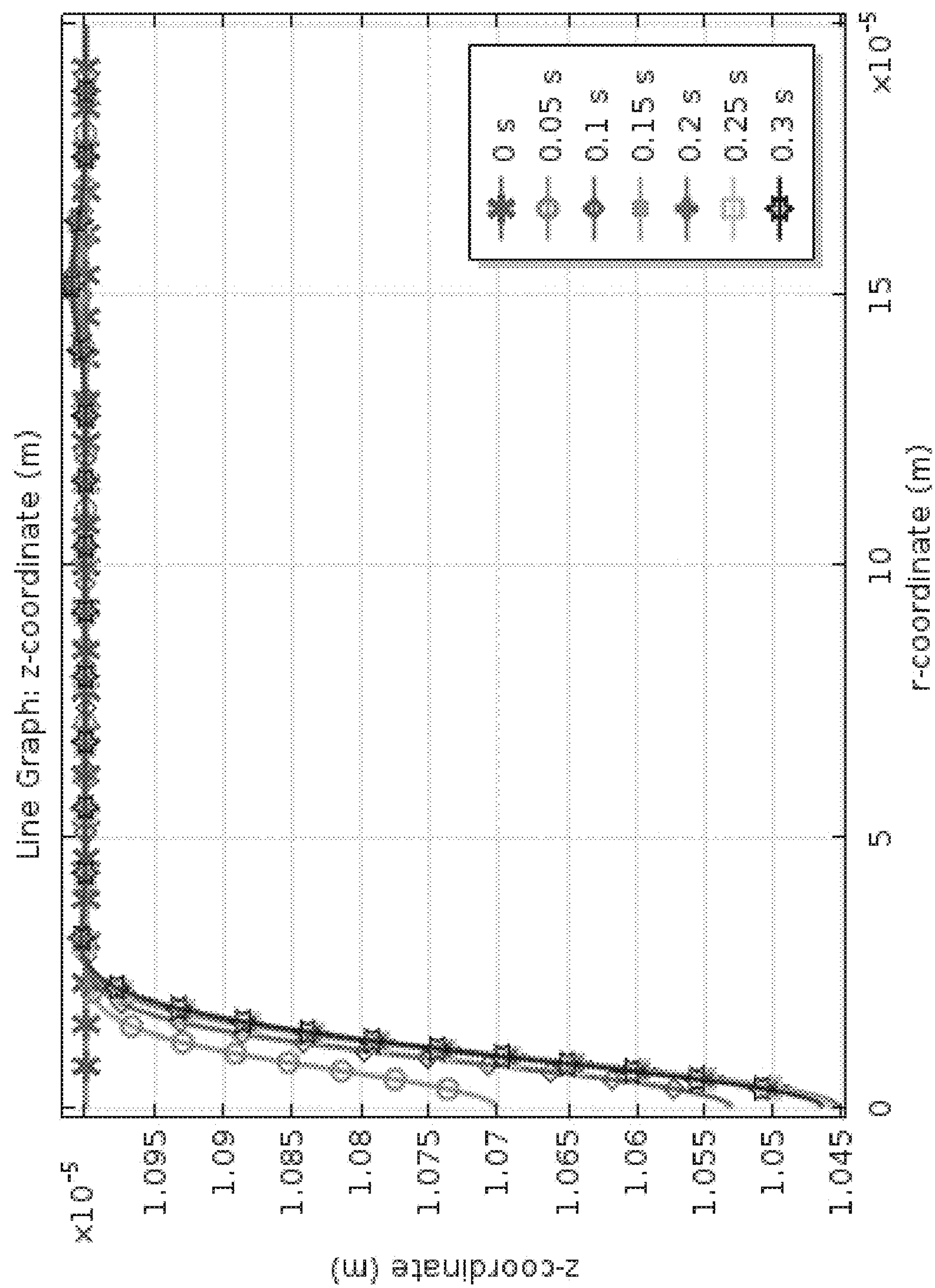
FIG. 9 is a schematic representation of an exemplary height profile over time under a $\sin^2(t)$ temperature variation according to an embodiment of the present invention.

FIG. 9 illustrates height profile over time under a $\sin^2(t)$ temperature variation according to an embodiment of the present invention.

It can be noted that while this solution takes the same approximate form, FIGS. 7 and 9 are not on the same length scale. The PDMS film only dewets to 0.45 μm in under the $\sin^2(t)$ temporal temperature variation, compared to a minimum thickness of 0.25 μm under a constant loading.

Power Variation

To determine the laser powers necessary for implementation, laser power is varied and the ensuing flows are simulated. Because the setup includes a 5 μm thick carbon block to diffuse heat before reaching the PDMS, it is reasonable to approximate an incident laser beam as a single point source at the bottom of the carbon block.

Figure 10:
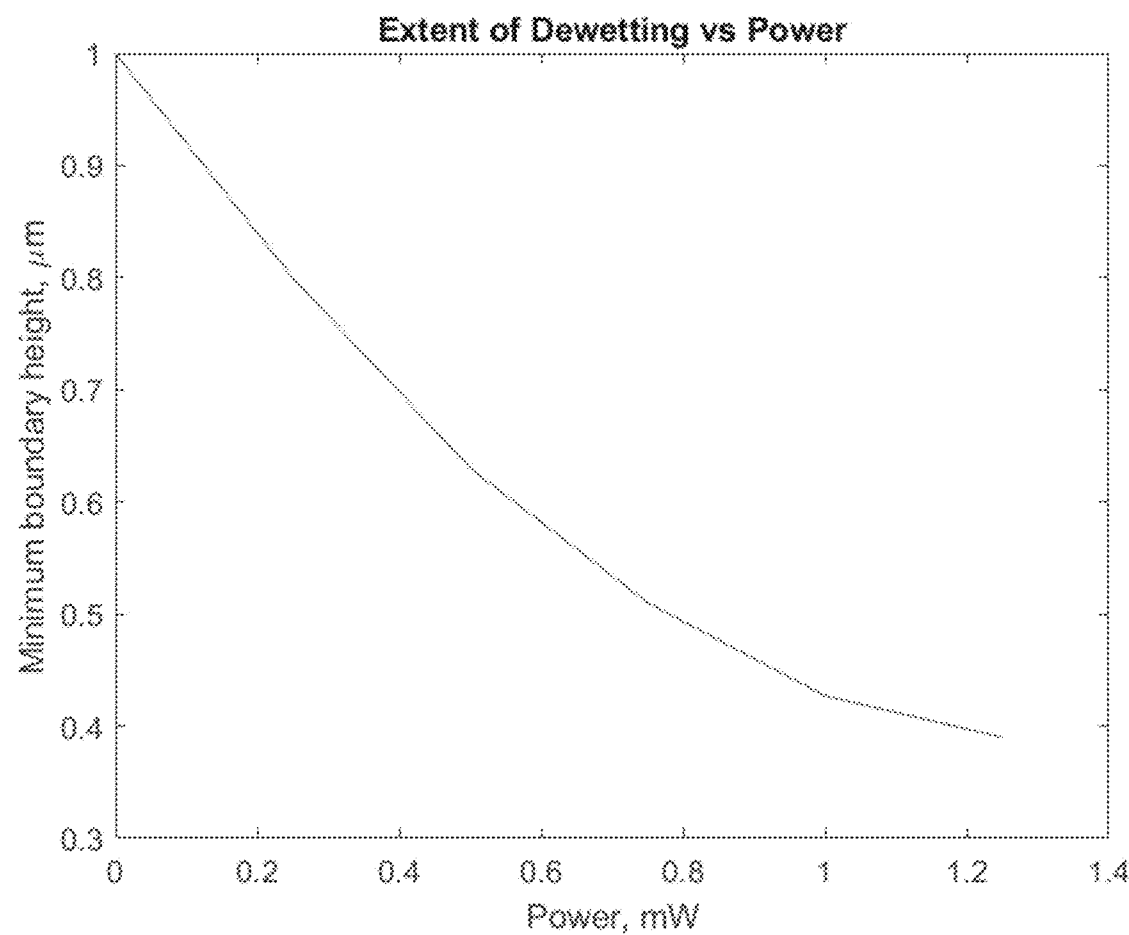
FIG. 10 is a schematic representation of an exemplary minimum interface height as a function of point source power according to an embodiment of the present invention.

FIG. 10 illustrates minimum interface height as a function of point source power according to an embodiment of the present invention. While the results in FIG. 10 are mathematically sound, compared to physical experiments, a 1 mW laser should not be nearly powerful enough to dewet the PDMS. An exemplary physical experiment is illustrated in J. P. Singer, "Thermocapillary Approaches to the Deliberate Patterning of Polymers," *Journal of Polymer Science Part B: Polymer Physics*, vol. 55, no. 22, pp. 1649-1668, 2017, which is incorporated herein by reference. This is in part due to limitations in the thermal model, but is also a result of excluding considerations of melting and consolidating in the polymer flow model. This is also evident in the fact that point source powers beyond 1.25 mW in this framework cause COMSOL errors when simulated because the resultant gradients are too high to model.

Reflow Considerations

According to some embodiments, reflow considerations may be examined by simply applying the raised temperature gradient from a 1 mW point source uniformly for 0.15 s, and then allowing the simulation to run at ambient temperature so that the surface irregularities will flatten under a directional force imbalance as shown in FIG. 9. A further exemplary surface irregularities flatten under a directional force imbalance is illustrated in J. W. M. Bush, Interfacial Phenomena Course Notes, MIT OpenCourseWare, 2010, which is incorporated herein by reference.

The solution peaks in the solid squares line after dewetting to 0.45 μm and then only barely begins to recede to hollow squares line and hexagrams line in the following 0.15 s. Allowing the simulation to proceed at uniform ambient temperature for 30 s leads to the result in FIG. 11.

Figure 11:
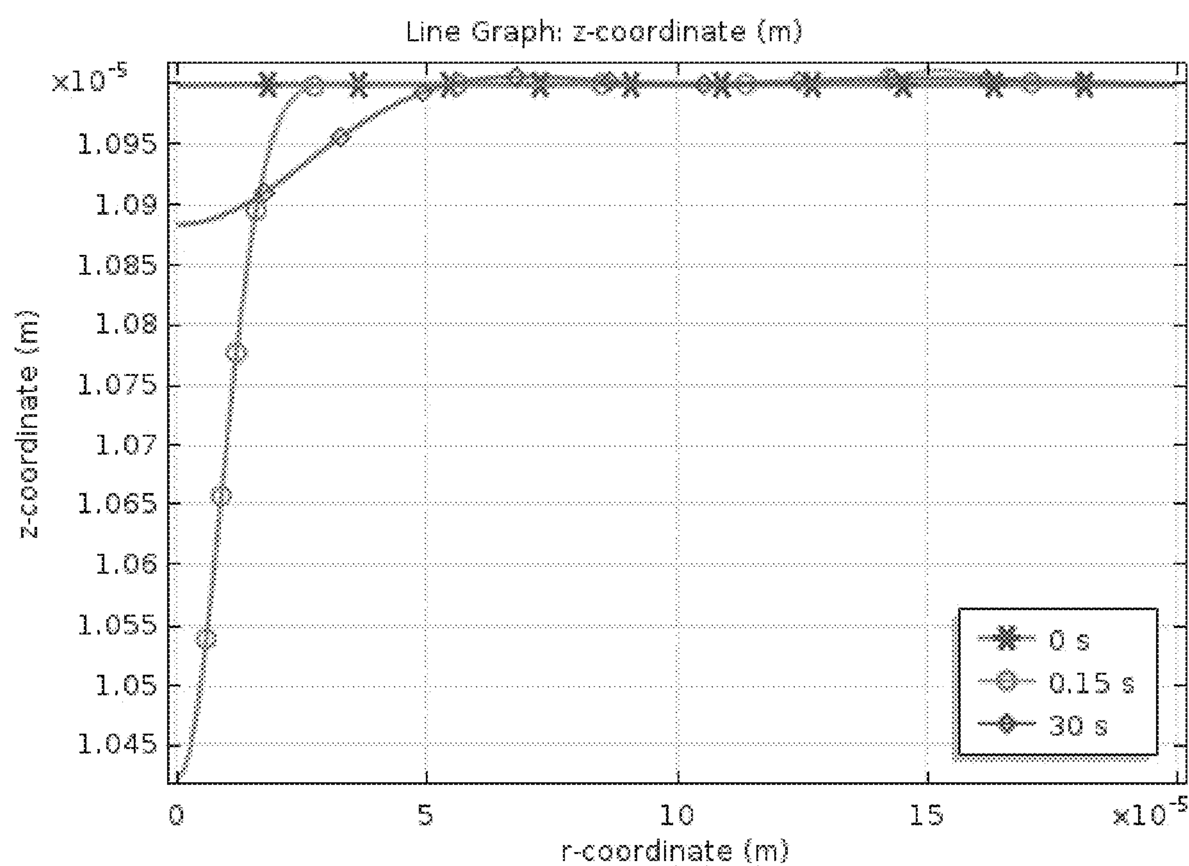
FIG. 11 is a schematic representation of exemplary polydimethylsiloxane ("PDMS") profiles according to an embodiment of the present invention.

FIG. 11 illustrates PDMS profiles at 0 s, 0.15 s of variable γ (circle line), and then after 30 s (diamond line) according to an embodiment of the present invention. As shown in FIG. 11, even 30 s later, the polymer layer is only ¾ of the way to its initial distribution. The experiment is repeated returning to a uniform temperature 100° C. higher after variation with nearly identical results. Therefore, in the limited context of this model, variations in absolute uniform surface tension on unstable profiles are essentially negligible compared to the effects of surface tension gradients used to create them.

Photonics Simulation

The commercial software MATLAB was used to simulate the intensity at the target probe as a consequence of the light being projected by the high-power laser. These sources are discretized by defining grid points within their boundaries. Each point on the probe surface has an electric field that is the sum of all values from the electric fields at each source grid point. This can amount to very high computational power if considering every physical detail of the modulation process shown in FIG. 4, so the study employs the following assumed simplifications:

Model beam from the final interface met within the SLM: The model will not simulate the propagation of the beam from lamp through polymer to mirror and so on until it reaches the target as would physically happen. Because the phase shift incurred by the PDMS depends only on its index of refraction and thickness, it can be found analytically and implemented into the simulation after it occurs. Thus, the model may assume the source of the beam is at the surface of the polymer right before it is transmitted through air towards the target. The source's grid points must be accordingly phase-shifted to compensate for the polymer that may or may not be present.

Gaussian beam approximated by a summation of point sources: As previously mentioned, a Gaussian beam may be approximated by a summation of point sources. The wave equation for a spherical wave (a point source) is given by Equation (1).

$$u(r,t)=\frac{A}{r}e^{i(\omega t\pm kr)} \tag{1}$$

Equation 1 illustrates a wave equation of a monochromatic spherical wave. The phase is the exponent of the exponential term. This wave equation is notably less complex than the equation for a Gaussian function, thereby requiring less computational power to evaluate. It is important to note that this approximation is only valid after some distance z from the source. Near-field observations do not demonstrate Gaussian distribution. This effect is shown in the mesh convergence section of this study.

Evaluate light only at the target: This simulation is primarily interested in the intensity profile at the powder target, so the model will not be evaluated elsewhere. From this and the first simplification, only two surfaces considered and meshed are the powder target and the surface of the SLM.

Reflections and absorptions are ignored: When the beam propagates across a physical interface, it will not be perfectly transmitted through the polymer layer. Part of the radiation will be absorbed or reflected at every interface. Reflected beams may affect the profile on the target, but their strength is assumed negligible for this simulation. This simplification can be described mathematically as $\rho_{Slygard}=\alpha_{Slygard}=\tau_{mirror}=\alpha_{mirror}=0$, where ρ is reflectivity, α is absorptivity, and τ is transmissivity.

2D dewetted pattern: The height of the polymer trenches created during the dewetting stage will be considered negligible. A large trench height to width aspect ratio could compromise the resolution of the resulting projection. Light near the edges of these trenches would be phase-shifted after it has already been reflected by the mirror or conversely only partially phase-shifted by the polymer at the other end of the trench. However, as shown in FIG. 5, this aspect ratio is 0.005, and so may be considered flat.

Perfectly flat and parallel polymer and mirror: This assumption states that there is no variance in the thickness of the Sylgard or mirror layers. This would otherwise lead to nonuniform phase shifts along the surface of the SLM.

Once converged, the simulation is used to observe the effects of the polymer phase shift on the intensity profile at the target. The phase shift is calculated analytically based on Equations 1-5 for a Gaussian beam at each point in the probe grid. Then, this phase is simply added to the exponential term in the spherical wave equation that is applied to each point in the grid. In FIG. 5, the completely phase-shifted beam is compared to the completely non-phase-shifted beam. Because the z to r aspect ratio is so large, the phase shift incurred by the polymer layer is approximately a uniform −1.5413 radians at all points, the variance lying beyond any reasonable choice of significant digits. This is an 88.31° phase shift, nearly a complete right angle, hence the wave front maxima in one plot appear to be located where the minima are in the other plot and vice versa.

Figure 12:
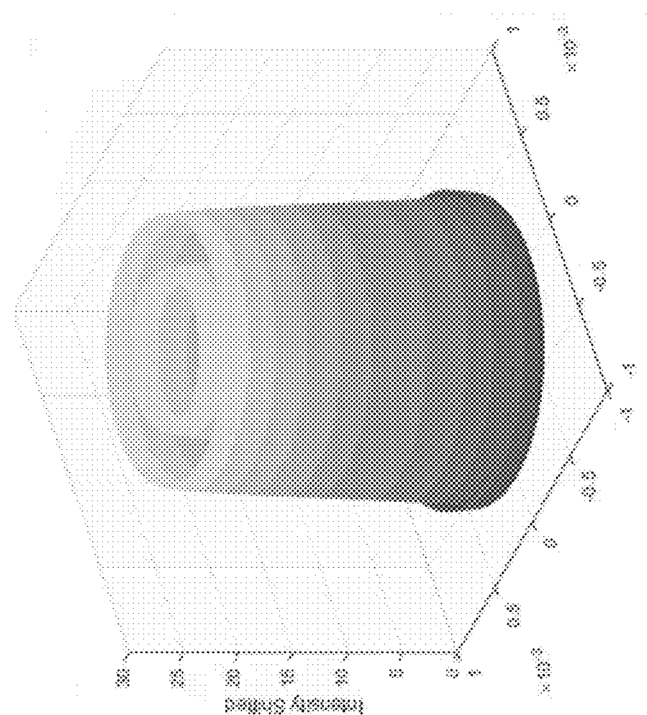
FIG. 12 is a schematic representation of an exemplary wave equation evaluated at converged values over a probe length 0.75 mm and evaluated at converged values over a probe length 0.75 mm but phase shifted by Sylgard PDMS according to an embodiment of the present invention.
Figure 12:
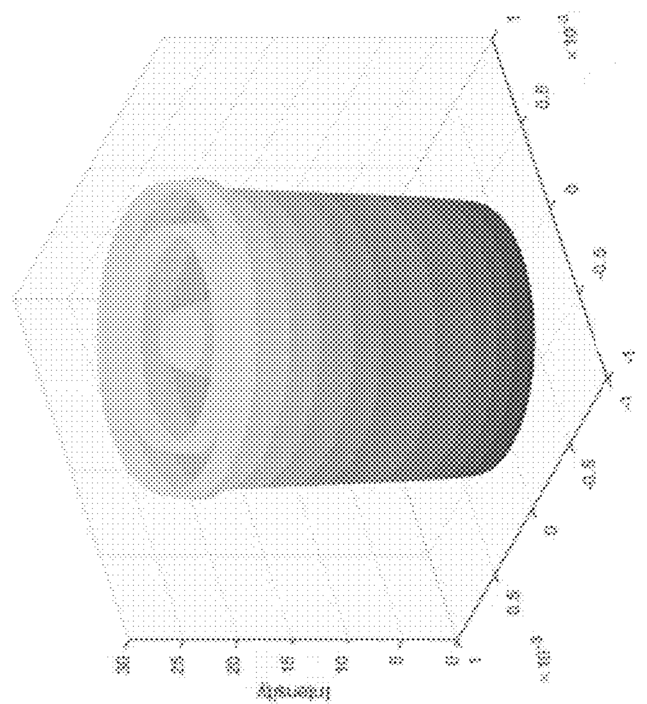

FIG. 12 illustrates wave equation evaluated at converged values over a probe length 0.75 mm on the left, and wave equation evaluated at converged values over a probe length 0.75 mm but phase shifted by Sylgard on the right.

Figure 13:
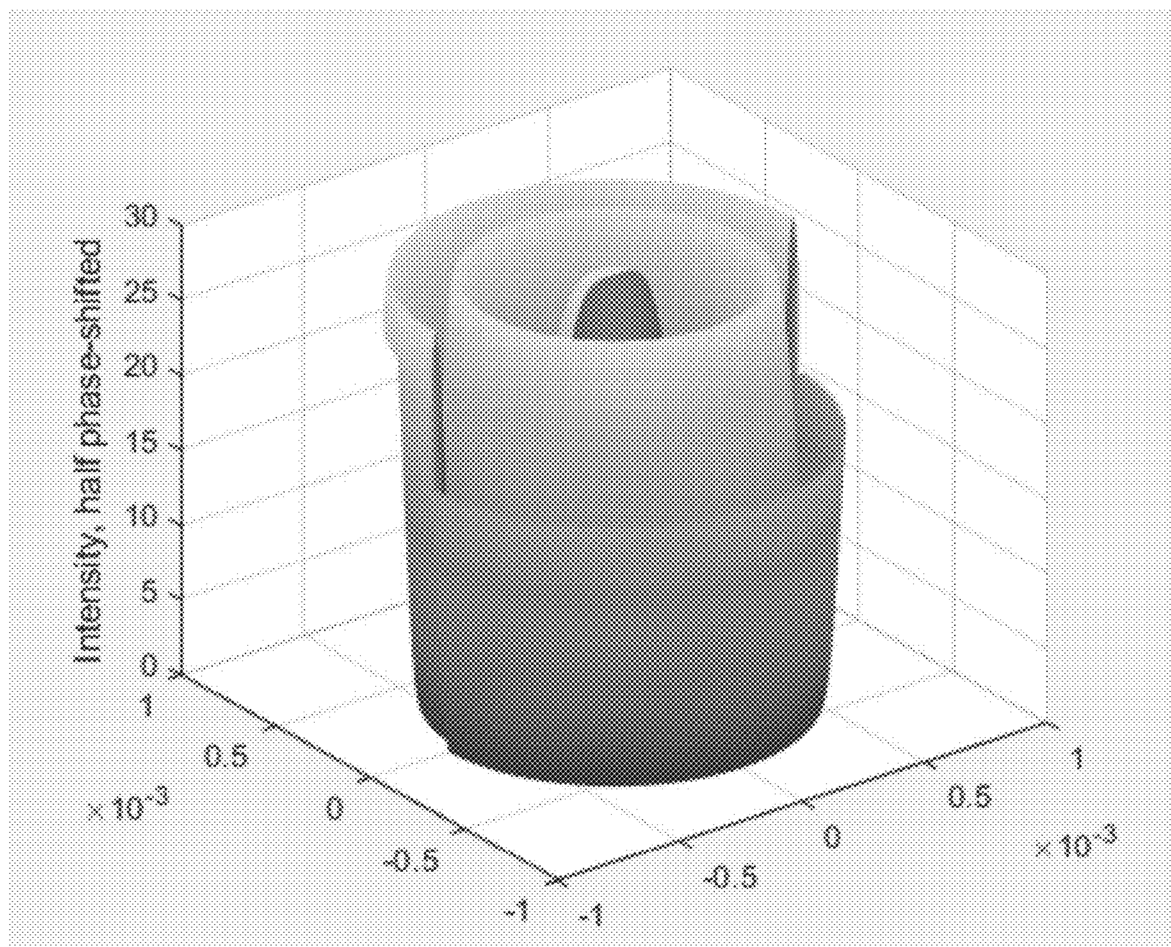
FIG. 13 is a schematic representation of an exemplary wave equation evaluated at converged height and mesh with points at $x>=0$ being reflected off a bare mirror, and points at $x<0$ being phase shifted by the polymer layer according to an embodiment of the present invention.

With this accomplished, it is also possible to observe a reflection from an SLM surface that is half polymer-coated, half exposed by dewetting, as in FIG. 13. FIG. 13 illustrates wave equation evaluated at converged height and mesh with points at x>=0 being reflected off a bare mirror, and points at x<0 being phase shifted by the polymer layer. This Figure demonstrates the drastic phase shift in a more immediate visual way, and shows that the simulation should be capable of handling more complex geometries than homogenous spot.

To summarized the above thermal, flow, and photonics simulations, the thermal simulation shows heated 2 μm PDMS film through 10 μm carbon using a point & line source; used a copper block as a heat sink and kept all other PDMS boundaries thermally insulated; simplification is justified because of length & time scales of experiment; found rise time, thermal gradient, and temperature profile at different values for applied heat sources (0.25-1.5 mW); rise time: time to attain constant thermal gradient, ~0.03 s; thermal gradient: change in temperature with respect to distance from center (dT/dr); and temperature profile: variation of temperature in 3D.

The flow simulation has imported temperature distributions from thermal simulations, applied them to liquid with the viscosity and density of silicone oil (2D axisymmetric); and powers are very low because physics not reflective of latent heat. Transient surface tension simulation shows laser center went from 1 μm to 0.25 m in ~0.15 s; and random buildup of material on outer edge due to axisymmetric simplification. Power variation: sin^2 loading dewetted to 0.45 μm in ~30 s. Reflow takes 30 s just to get halfway back to ground state: won't return to ground state without additional dewetting.

The photonics simulation has modeled a Gaussian beam originating from a flat surface and focused on the printing target. Gaussian beam source approximated by modeling it as an array of point sources.

Simplifications that have been used in the photonics simulation are:

Beam not modeled from original source in device, just from reflection at the patterned mirror; light intensity only evaluated at the target; no consideration of unintentional light absorption or reflection anywhere in the model; the height of trenches in the polymer pattern dewetted onto the SLM is ignored; and everything is perfectly flat, no unevenness.

During the photonics simulation the phase shift induced by the light reflection passing through the polymer is large and must be further studied before construction of a prototype.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same While a number of embodiments of the present invention have been described, it is understood that these embodiments are illustrative only, and not restrictive, and that many modifications may become apparent to those of ordinary skill in the art, including that the inventive methodologies, the inventive systems, and the inventive devices described herein can be utilized in any combination with each other. Further still, the various steps may be carried out in any desired order (and any desired steps may be added and/or any desired steps may be eliminated).

What is claimed is:

1. An apparatus, comprising:

a mirror-like thin film including a front surface and a back surface, wherein the mirror-like thin film is configured to reflect a laser beam; and a layer of a mask material on top of the front surface of the mirror-like thin film, wherein the mask material is transparent to the laser beam and is dewetted by a heat source to create a height profile in the mask material.

2. The apparatus of claim 1, wherein the heat source is a focused optical spike ("FOSk") source and a supporting element supporting the mirror-like thin film through contact with the back surface of the mirror-like thin film, wherein the supporting element is transparent to the optical source.

3. The apparatus of claim 2, wherein the heat source produces a local heated area in the mirror-like thin film.

4. The apparatus of claim 1, wherein the heat source is a laser.

5. The apparatus of claim 1, wherein the heat source is provided by electronic heaters.

6. The apparatus of claim 1, wherein the mask material is not heated directly by the laser beam.

7. The apparatus of claim 1, wherein the mirror-like thin film is composed of one or more materials.

8. The apparatus of claim 1, wherein the mirror-like thin film is composed of one or more layers.

9. The apparatus of claim 1, wherein the heat source has a spatially-varying energy profile.

10. The apparatus of claim 9, wherein the spatially-varying energy profile of the heat source is varied dynamically so that a spatial distribution of energy spikes changes over time, causing the height profile of the mask material to also change over time.

11. The apparatus of claim 9, wherein the spatially-varying energy profile is imposed on the heat source by a separate spatial light modulator ("SLM").

12. The apparatus of claim 1, further comprising a guiding means for guiding the heat source to the back surface of the mirror-like thin film.

13. The apparatus of claim 1, wherein the laser beam passes through the height profile of the mask material before and after it is reflected by the mirror-like thin film, resulting in changes in a wave front of the laser beam.

14. The apparatus of claim 1, wherein the wave front of the laser beam varies over time while it passes through a time-varying height profile of the mask material.

15. A method, comprising:

guiding a heat source having a spatially-varying energy field having energy spikes to a back surface of a mirror-like thin film, wherein a layer of a mask material is on top of a front surface of the mirror-like thin film;

inducing dewetting at the front surface of the mirror-like thin film by heating the mirror-like film via the heat source; and creating, via the dewetting, a height profile in the mask material by causing the mask material to accumulate adjacent to dewetted areas of the mirror-like thin film, wherein the height profile represents a distribution of the dewetted areas of the mirror-like thin film.

16. The method of claim 15, wherein the heat source impinges on the back surface of the mirror-like thin film producing a local heated area in the mirror-like thin film.

17. The method of claim 16, wherein the local heated area comprises a spatial distribution of temperature spikes that correspond to the spatial distribution of the energy spikes of the heat source impinging on the back side of the mirror-like thin film.

18. An apparatus, comprising:

a mirror-like thin film including a front surface and a back surface, wherein the mirror-like thin film is configured to reflect a laser beam; and a layer of a mask material on top of the front surface of the mirror-like thin film, wherein the mask material is transparent to the laser beam and is dewetted by a heat source to create a height profile in the mask material, wherein the mask material is a molten-phase mask material selected from the group consisting of silicon oils, paraffin oils, and thermoplastic polymers.

19. An apparatus, comprising:

a mirror-like thin film including a front surface and a back surface, wherein the mirror-like thin film is configured to reflect a laser beam; and a layer of a mask material on top of the front surface of the mirror-like thin film, wherein the mask material is transparent to the laser beam and is dewetted by a heat source to create a height profile in the mask material, wherein the mirror-like thin film is a thin film of a material selected from a group of materials consisting of gold, tungsten, aluminum, and silver.

20. An apparatus, comprising:

a mirror-like thin film including a front surface and a back surface, wherein the mirror-like thin film is configured to reflect a laser beam; and a layer of a mask material on top of the front surface of the mirror-like thin film, wherein the mask material is transparent to the laser beam and is dewetted by a heat source to create a height profile in the mask material, wherein the heat source is a focused optical spike ("FOSk") source and a supporting element supporting the mirror-like thin film through contact with the back surface of the mirror-like thin film, wherein the supporting element is transparent to the optical source, wherein the heat source produces a local heated area in the mirror-like thin film, and wherein the local heated area comprises a spatial distribution of temperature spikes that correspond to a spatial distribution of energy spikes impinging on the back surface of the mirror-like thin film and induce an FOSk dewetting of the mask material on top of the mirror-like thin film.

* * * * *